United States Patent [19]

Ohno

[11] Patent Number: 4,698,070
[45] Date of Patent: * Oct. 6, 1987

[54] CUTTING INSERT FOR INTERRUPTED HEAVY MACHINING

[75] Inventor: John M. Ohno, Plymouth, Mich.

[73] Assignee: General Electric Company, Detroit, Mich.

[*] Notice: The portion of the term of this patent subsequent to Mar. 12, 2002 has been disclaimed.

[21] Appl. No.: 331,380

[22] Filed: Dec. 16, 1981

[51] Int. Cl.⁴ .............................. C04B 35/56
[52] U.S. Cl. ............................ 51/307; 51/309
[58] Field of Search ............... 51/307, 309; 264/60

[56] References Cited

U.S. PATENT DOCUMENTS

| | | | |
|---|---|---|---|
| 2,938,807 | 5/1960 | Anderson | 106/44 |
| 3,816,081 | 6/1974 | Hale | 75/203 |
| 4,018,631 | 4/1977 | Hale | 428/469 |
| 4,063,909 | 12/1977 | Mitchell | 51/309 |
| 4,120,731 | 10/1978 | Hillig et al. | 264/271 |
| 4,124,401 | 11/1979 | Lee et al. | 51/307 |
| 4,151,686 | 5/1979 | Lee et al. | 51/307 |
| 4,167,399 | 9/1979 | Lee et al. | 51/307 |
| 4,168,957 | 9/1979 | Lee et al. | 51/309 |
| 4,171,339 | 10/1979 | Lee et al. | 264/332 |
| 4,173,614 | 11/1979 | Lee et al. | 51/307 |
| 4,219,339 | 8/1980 | Wilson | 51/307 |
| 4,220,455 | 9/1980 | St. Pierre | 51/295 |
| 4,220,677 | 9/1980 | Fedaseev et al. | 427/215 |
| 4,231,195 | 11/1980 | DeVries | 51/307 |
| 4,238,433 | 12/1980 | Hillig et al. | 264/60 |
| 4,241,135 | 12/1980 | Lee et al. | 428/332 |
| 4,242,106 | 12/1980 | Morelock | 51/307 |
| 4,247,304 | 1/1981 | Morelock | 51/295 |
| 4,268,582 | 5/1981 | Hale | 428/466 |
| 4,504,284 | 3/1985 | Ohno | 51/308 |

FOREIGN PATENT DOCUMENTS

| | | |
|---|---|---|
| 010257 | 4/1980 | European Pat. Off. . |
| 012966 | 7/1980 | European Pat. Off. . |
| 2006733 | 5/1979 | United Kingdom . |

Primary Examiner—James Derrington
Attorney, Agent, or Firm—Hedman, Gibson, Costigan & Hoare

[57] ABSTRACT

A cutting insert is provided with at least one crystal portion containing a first concentration of super-hard crystals, such as diamond or cubic boron nitride crystals, and core portion. The crystal portion and the core portion are united by a matrix of β-silicon carbide and silicon and exclusively form a composite having an approximate thickness of at least ⅛ inch, thus obviating the need for bonding the cutting insert onto a carbide substrate. Additional crystal layers, having a concentration of crystals less than that of the first crystal layer, may be provided, the crystal and core layers being configured in a number of different configurations in order to optimize particular machining requirements.

15 Claims, 19 Drawing Figures

CUTTING INSERT FOR INTERRUPTED HEAVY MACHINING

BACKGROUND OF THE INVENTION

The present invention is directed to silicon carbide cutting inserts of the type produced in accordance with teachings of U.S. patent application Ser. Nos. 167,019 and 167,196, by Dr. John M. Ohno, both filed July 9, 1980, both now abandoned, and assigned to the assignee of the present invention, the entire disclosures of which are hereby incorporated by reference.

Articles composed of materials having refractory characteristics such as hardness and resistance to erosion have many important uses in the fields of metal machining, such as boring, facing and the like. Representative materials are described in U.S. Pat. No. 2,938,807 to Anderson. More recently, a dispersion of a mass of diamond or other super-hard crystals is bonded together by a silicon containing bonding medium comprised of silicon carbide and a carbide of a metal component, such as that disclosed in U.S. Pat. No. 4,124,401 to Lee et al., and assigned to the assignee of the present invention. Such a polycrystalline diamond body is made by a high pressure-high temperature technique. The polycrystalline body may be sectioned into wafers, and the wafers brazed or otherwise bonded onto a pocket in a carbide substrate, one such construction being that of CARBO-PAX ®, which is made by the assignee of the present invention.

The above-mentioned technique for forming a cutting insert is very expensive and time consuming. Further, the inserts produced in accordance with this process are not indexable, thereby further increasing operating costs.

Recently, a new technique for economically and rapidly forming a polycrystalline diamond or cubic boron nitride body has been disclosed in the above-mentioned Ser. Nos. 167,019 and 167,196, both now abandoned. A straightforward technique (hereinafter referred to as the "press and treat" technique) for forming high quality cutting inserts is disclosed therein. Very briefly, the press and treat technique involves the preparation of a first or crystal dispersion of super-hard crystals such as diamond or cubic boron nitride crystals in carbon black and a second or a core dispersion of carbon black, carbon fiber and filler material (usually silicon carbide). The two dispersions are individually mixed with a small amount of temporary binder, such as paraffin, to lend a sufficient green strength to the two dispersions upon cold compaction thereof. After compacting the two dispersions together in a desired configuration, the compact is vacuum heated in the presence of silicon to burn off the paraffin and to allow the silicon to infiltrate both dispersions. Upon further heating, and without the need for the constant application of any type of pressure to the insert, the silicon reacts with the carbon black to form a β-silicon carbide and a silicon matrix which bonds both dispersions both internally and to each other.

One such insert made according to the press and treat technique is described in co-pending U.S. patent application Ser. No. 226,603, filed Jan. 21, 1981, now abandoned, by Dr. John M. Ohno, and assigned to the assignee of the present invention, the entire disclosure of which is hereby incorporated by reference. The cutting insert produced in accordance with Ser. No. 226,603, now abandoned, includes a first layer containing super-hard crystals in a silicon carbide base, and a core layer. The composite is sandwiched between a metallic plate on top of the diamond surface and a metallic carbide base bonded to the core layer. Such insert performs well in high speed finish machining operations, such as the finish milling of Al-Si alloys.

In pending U.S. patent application Ser. No. 226,604, filed Jan. 21, 1981, now abandoned by Dr. John M. Ohno, and assigned to the assignee of the present invention, the entire disclosure of which is also incorporated by reference, a technique for producing a three layer bonded composite using the press and treat technique is disclosed. Specifically, an additional or intermediate super-hard crystal dispersion layer is disposed underneath the super-hard top layer around the periphery of the core, with the percentage of crystal material in the intermediate layer being less than that of the top layer which provides the cutting surface. The intermediate or peripherial layer is provided to hold the top layer rather than for wear-resistance. The insert is adapted to be bonded onto a tungsten carbide substrate and is designed primarily for the finish machining of abrasive nonferrous materials under typical conditions which include (a) a very high speed range such as 1,700–3,000 SFPM, (b) a small feed of 0.0025–0.003 inches per revolution and (c) a small depth of cut from 0.030 to 0.015 inches. Under such conditions, the insert provides efficient machining, high quality surfaces and a smear free finish with a significant cost savings.

However, the automobile industry now requires a type of insert which has much wider scope of capability, namely rough and interrupted heavy machining (up to 0.1 inch in cut depth) and high speed finish machining (1,500 SFPM) in continuous production lines. Typical new requirements are tabulated below in Table I.

TABLE I

|  | SPEED (SEPM) | FEED (in/rev) | DEPTH OF CUT |
| --- | --- | --- | --- |
| Previous Requirements | 2000–3000 | <.009 | <.030 |
| New Requirements (Examples) | 1500 | .014 | .050 |
|  | 1500 | .010 | .080 |
|  | 1000 | .010 | .100 |

Castings of an Al-Si alloy provided at the receiving end of a production line typically have uneven wall thicknesses, interruptions due to openings in the design, voids and left over in-gate projecting from the surfaces. Therefore, the machining of such castings is not a simple and steady operation, but rather a high speed, interrupted and rough machining operation.

Further, for some applications, the auto industry requires such high speed, interrupted and rough machining operations using a triangularly shaped insert having a small nose radius. Due to the acuteness of the angle provided at the cutting point of the insert, such inserts are inherently weak in design, thus compounding the problem of rough machining. The use of such triangular inserts is necessary to machine corners of castings, for example.

Other configurations for the insert, such a square may be desired for facing of Al-Si 390 alloy castings, for example.

SUMMARY OF THE INVENTION

It is therefore an object of the present invention to provide improved inserts designed for the machining of Al-Si alloy castings.

It is a further object of the present invention to enhance the capability of cutting inserts, particularly increasing the effective cutting depth of the insert.

It is a further object of the present invention to provide an improved square cutting insert for facing of Al-Si alloy castings.

In accordance with the first aspect of the present invention, a cutting insert is comprised of a polygonal composite having a plurality of corners, the composite including (i) a top layer covering the composite including a first concentration of super-hard crystals, such as diamond or cubic boron nitride crystals, (ii) a core layer and (iii) corner portions containing a second concentration of superhard crystals disposed exclusively at the corners of the composite between the top layer and the core layer. The top layer, core layer and corner portions are united by a matrix of silicon carbide and silicon.

In accordance with a first embodiment of the invention, the second concentration is lower than the first concentration and the composite is generally triangular in shape.

In accordance with a second embodiment of the invention, the first and second concentrations are substantially equal, the top layer and the corner portions forming an integral for the insert.

In accordance with a third embodiment of the invention, the second concentration is lower than the first concentration and the composite is generally square in shape.

In accordance with each of the above embodiments, the top layer, core layer and corner portions exclusively combine to form a composite having a standard thickness of ⅛ inch 3/16 inch, whereby the composite may be used without a substrate. A portion of the top layer may be polished in order to avoid the build up of the machined material thereon.

A cutting insert in accordance with the second aspect of the present invention includes at least one crystal portion containing a first concentration of superhard crystals, such as diamond or cubic boron nitride crystals, and a core portion. The crystal portion and the core portion are united by a matrix of silicon carbide and silicon and exclusively form a composite having a standard thickness of ⅛ inch or 3/16 inch.

In accordance with a fourth embodiment of the invention, the composite is polygonal in shape and the crystal portion includes first crystal portions disposed exclusively in the corners of the composite.

In accordance with a fifth embodiment of the invention, the insert includes additional crystal portions containing a second concentration of super-hard crystals lower than the first concentration. The second crystal portions are disposed between the first crystal portions of and the core portion.

In accordance with a sixth embodiment of the invention, the composite is generally circular in shape and the crystal portion is disposed exclusively about the periphery of the composite extending from the upper surface of the composite to a depth of approximately ½ the thickness of the composite.

In accordance with a seventh embodiment of the invention, the composite is polygonal in shape and the crystal portion includes a top crystal layer disposed over the entire top surface of the composite.

Finally, in accordance with an eighth embodiment of the invention, the crystal portion forms the upper surface of the composite, and the cutting insert further includes an additional crystal portion containing second concentration of super-hard crystals lower than the first concentration. The second crystal portion is disposed about the periphery of the composite adjacent to the first crystal portion extending to a depth of approximately ½ the thickness of the composite.

BRIEF DESCRIPTION OF THE DRAWINGS

These and other objects, embodiments, and aspects of the present invention discussed above will be further described with reference to the following drawing figures of which:

FIGS. 3A and 3B-6A and 6B illustrate inserts having a generally triangular shape which do not require bonding onto carbide substrates and which have crystal portions disposed on the composite in particular configurations.

DETAILED DESCRIPTION OF THE INVENTION

Figure 1A:
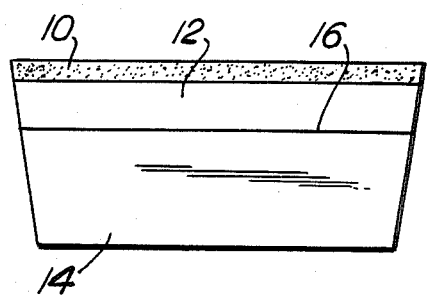
FIGS. 1A-1D illustrate cutting inserts having a composite bonded onto a carbide substrate.

FIGS. 1A-1D illustrate examples of inserts which can be produced using the press and treat technique described above, and which have been described in various co-pending patent applications by Dr. John M. Ohno. In particular, FIG. 1A illustrates the bonded composite produced in accordance with Ser. No. 167,196, now abandoned, which comprises a first layer 10 having a dispersion of diamond crystals bonded by matrix of silicon carbide and silicon, and a core layer 12 comprising a dispersion of carbon fiber and filler in a matrix of silicon carbide and silicon. The bonded composite is further bonded onto a substrate 14 by means of a bond layer 16 which may comprise an adhesive or layer of compounds which facilitates the brazing of the composite to substrate 14, as more fully disclosed in co-pending patent application Serial No. 331,377, filed Dec. 16, 1981, now U.S. Pat. No. 4,460,382 filed concurrently herewith, by Dr. John M. Ohno and assigned to the assignee of the present invention.

Figure 1B:
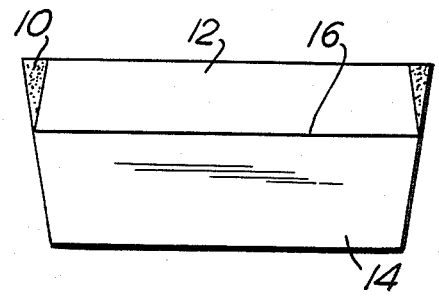

FIG. 1B illustrates the composite produced in accordance with Ser. No. 167,019, and is essentially identical to that shown in FIG. 1A except that the diamond dispersion layer 10 is provided only on the periphery of the composite, thus reducing the total amount of requisite diamond material.

Figure 1C:
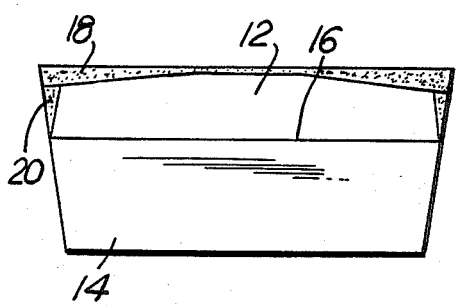

FIG. 1C illustrates the composite produced in accordance with Ser. No. 226,604, now abandoned, and comprises a three layer bonded composite which employs both a top layer 18 of super-hard crystal material in the matrix of silicon carbide and silicon, and a peripheral layer 20 of the same crystal material also in the matrix of silicon carbide and silicon, the concentration of crystal material in layer 18 being greater than that of layer 20.

As with the previous two examples, the composite shown in FIG. 1C is provided with core 12 and substrate 14.

Figure 1D:
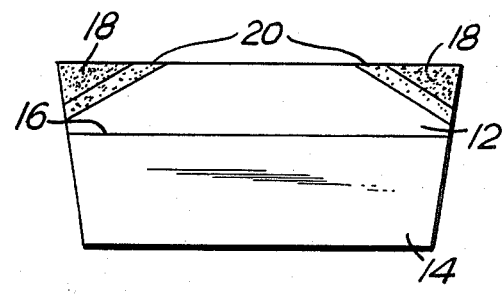

FIG. 1D illustrates a composite produced in accordance with the teaching of Ser. No. 286,613, filed July 24, 1981, now U.S. Pat. 4,504,484 by Dr. John M. Ohno and assigned to the assignee of the present invention, the entire disclosure of which is hereby incorporated by reference. The composite shown in FIG. 1D is similar to that of FIG. 1C insofar as it employs two layers of crystal containing material, 18 and 20. The configuration differs from that of FIG. 1C however, in that the higher concentration crystal material 18 is provided exclusively along the periphery of the composite, the lower concentration layer 20 providing an interface between layer 18 and core layer 12.

The present invention employs the various features of the above-described composites in order to produce a cutting insert which has the qualities and characteristics required for the rough and interrupted cutting operations described above.

An improved of the inserts over those disclosed in the above-mentioned pending applications is a dramatic increase in the thickness of the silicon carbide core. In FIGS. 1A-1D, it can be seen that the composites previously employed are thin (on the order of 0.060 inches in thickness) and bonded onto a substrate typically comprised of tungsten carbide. This is in contrast to the inserts in accordance with the present invention shown in FIGS. 2-8, which are made to a thickness of ⅛ or 3/16 of an inch without bonding onto a tungsten carbide substrate. The inserts of FIGS. 2A-2C and 8 are essentially identical to the inserts of FIGS. 1A-1D, respectively, except that the latter are mounted on a substrate, while the former are provided with the thicker construction, thereby obviating the substrate. The thicker composite is readily produced by the press and treat process described above.

Figure 2A:
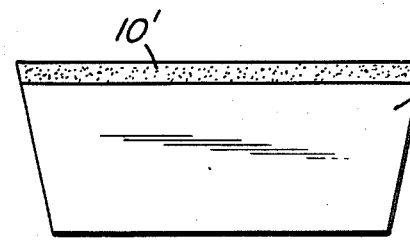
FIGS. 2A-2C illustrate composites not bonded onto carbide substrates, the crystal portions thereof being disposed on the composite in particular configurations.
Figure 2B:
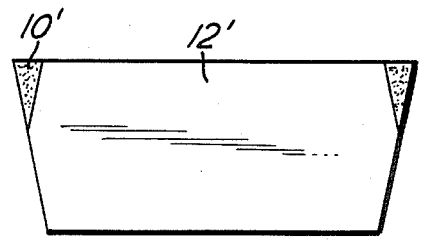
Figure 2C:
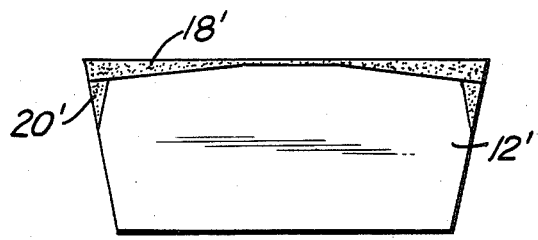

The configurations of the composites shown in FIGS. 2A-2C and FIG. 8 are identical to that shown in FIGS. 1A-1D, respectively, the composites shown in FIGS. 2A and 2B having crystal layers 10' and core 12'. The composite shown in FIG. 2C has the top crystal layer 18' and peripheral crystal layer 20', while the composite of FIGS. 8A and 8B employs high concentration crystal layer 44, intermediate crystal layer 46 and core 38 corresponding to layers 18, 20 and 12, respectively, of the insert of FIG. 1D Many continuous production lines involve changes in machining conditions, such as speed, feed and depth of cut, as well as changes in the type of operation, such as facing, boring, turing and chamfering. Thus, a triangular insert having a small "nose radius", which is capable of finishing corners or products, is many times required to provide an assortment of the additional functions described above.

Figure 3A:
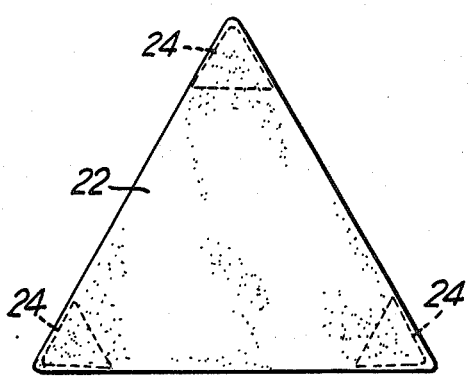
Figure 3B:
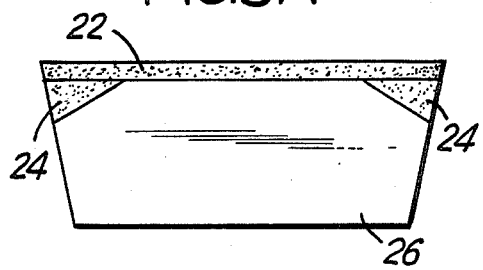

By concentrating a higher percentage of fine diamond or cubic boron nitride crystal in critical areas instead of the entire periphery, the depth of cut capability for a triangular cutting insert may be improved. With reference to FIGS. 3A, 3B, 4A and 4B, a higher density of super-hard crystal material in each corner of the inserts is provided both for wear-resistance as well as for bonding the top most layer. The top layer on the other hand is provided for wear-resistance as well as for providing a bridge between the corners, thus preventing the problem of lamination failure. With particular reference to FIGS. 3A and 3B, top layer 22 is provided with a high concentration of crystal material and is disposed over the entire upper surface of the insert. Corner material 24 is also provided with a high concentration of crystal material, but slightly lower than that of the top layer 22. The corner material 24 is disposed between the top layer 22 and core material 26 exclusively at the corners of the insert.

Figure 4A:
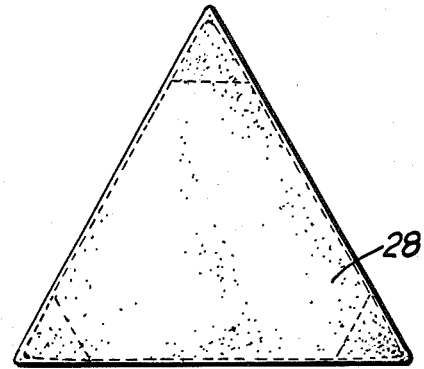
Figure 4B:
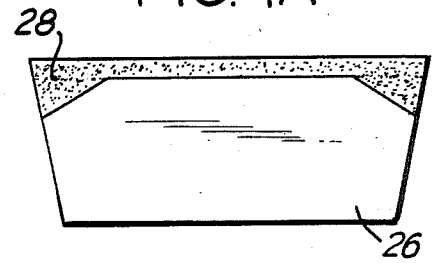

FIGS. 4A and 4B show an alternative to the insert illustrated in FIGS. 3A and 3B and are provided with a top and corner layer 28 which essentially integrates the top layer 22 and the corner layer 24 of the insert of FIG. 3A and 3B.

Generally, the weight percentage of crystal disposed in top layer 22 and corner portions 24 for the composite illustrated in FIGS. 3A and 3B are approximately 80-90 percent for the top layer 22 and 50-83 percentage for the corner portions 24. This can be compared to weight percentages of greater than 80 percent for the top layer and 40-80 percent for the periphery in Ser. No. 226,604, now abandoned, and greater than 80 percent for the corners and less than 80 percent for the interface layers in Ser. No. 286,613, now U.S. Pat. No. 4,504,284.

A small amount of boron may be added to the core material to prevent coarsening of β-silicon carbide during silicon infiltration, as more fully described in co-pending, now abandoned U.S. patent application Ser. No. 331,379 filed Dec. 16, 1981, filed concurrently herewith, the entire disclosure of which is hereby incorporated by reference. Specific examples of the various percentage weights of constituent elements in the inserts of FIGS. 3A and 3B and 4A and 4B are shown below as Tables II and III, respectively.

TABLE II

|  | DIAMOND | β SiC | Si | Boron | FILLER* |
|---|---|---|---|---|---|
| Top Layer 22 | 83-84 | 5-6 | 8-11 | | |
| Corners 24 | 80-82 | 6-9 | 8-11 | | |
| Core 26 | | 30-40 | 15-22 | 0.3-0.6 | 40-50 |

*α SiC or β SiC

TABLE III

|  | DIAMOND | SiC | Si | Boron | FILLER* |
|---|---|---|---|---|---|
| Top & Corners 28, | 80-82 | 6-8 | 8-11 | | |
| Core 26 | | 30-40 | 15-22 | 0.3-0.6 | 40-50 |

*α SiC or β SiC

A further improvement over the inserts disclosed in the above-mentioned co-pending patent applications, resides in the polishing of the inserts at the critical areas such as the top and corner portions thereof, in order to prevent the build-up of the material which is been machined, such as Al-Si alloy. The polishing can be accomplished without grinding thereby eliminating difficulties encountered in the grinding operations such as grinding cracks, the separation of crystals from the critical areas and prohibitive expense. Specifically, the lapping or polishing may be accomplished on a rotating cast iron disk using No. 4 diamond polishing powder.

Figure 5A:
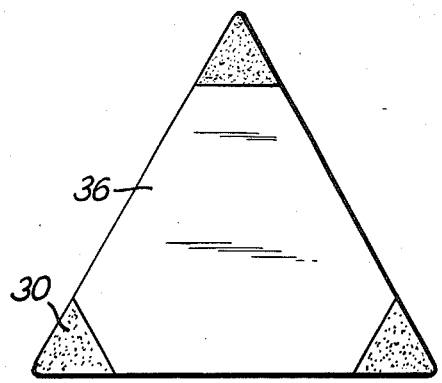
Figure 6A:
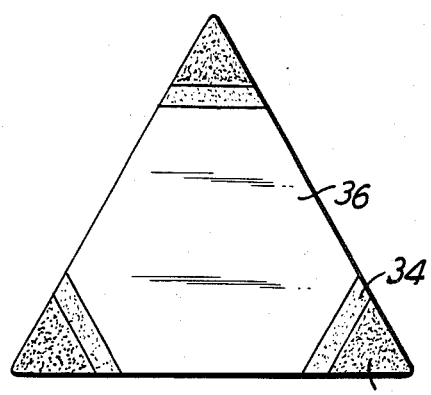
Figure 5B:
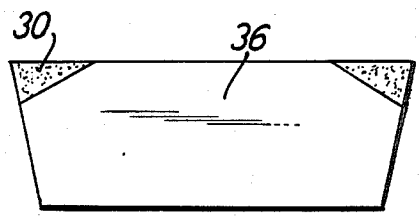
Figure 6B:
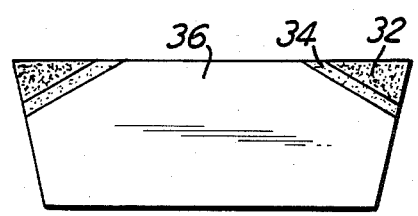

FIGS. 5A, 5B, 6A and 6B illustrate alternative configurations from those of FIGS. 3A, 3B, 4A and 4B. Specifically, the insert illustrated in FIGS. 5A and 5B is provided with crystal layer 30 disposed exclusively at the corner portions of the insert, while the insert illustrated in FIGS. 6A and 6B is provided with a pair of crystal layers 32 and 34 also exclusively provided at the corners of the insert. Unlike the insert of FIGS. 3A, 3B, 4A and 4B, the inserts of FIGS. 5A and 6B are not provided with a crystal layer over the entire top portion of the insert.

The inserts shown in FIGS. 5 and 6 are provided with a ⅛ or 3/16 inch thick core 36 thus obviating the need for brazing or adhesive bonding to a substrate.

A comparison of the wear-resistance of the inserts produced as shown in FIGS. 3-6 to that of standard grade 883 carbide cutting inserts for turning on an Al-Si 390 casting with coolant is tabulated in Table IV below.

TABLE IV

|  | SPEED | FEED | D/C | TIME | WEAR |
|---|---|---|---|---|---|
| Old Insert | 1500 | .014 | .050 | 30 sec. | .0123 |
|  |  |  |  | 60 sec. | .0245 |
| New Insert | 1500 | .014 | .050 | 1 min. | .0081 |
|  | 1500 | .014 | .050 | 2 min. | .0119 |
|  | 1500 | .014 | .050 | 3 min. | .0138 |
|  | 1500 | .014 | .050 | 4 min. | .0150 |

Figure 7A:
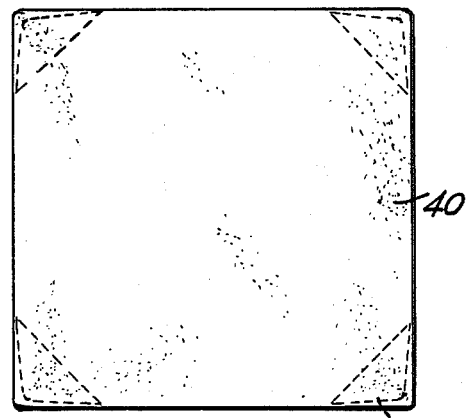
FIGS. 7A and 7B and 8A and 8B illustrate inserts which have a generally square shape and which do not require bonding onto a carbide substrate, the crystal portions of the composites being disposed in particular configurations.
Figure 7B:
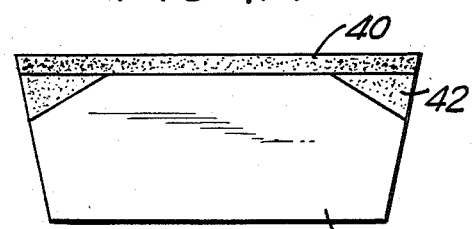

FIGS. 7A, 7B, 8A and 8B illustrate the configuration of inserts designed particularly for facing operations. Like the inserts illustrated in FIGS. 3-6, inserts of FIGS. 7 and 8 are provided with a thick core 38, thus obviating the need for bonding to the carbide substrate. The insert shown in FIGS. 7A and 7B is similar to that of FIGS. 3A and 3B, the insert comprising a top layer 40 having a high concentration of super-hard crystals as well as crystal material 42 disposed exclusively at the corners of the insert between the top layer 40 and core 38, corner material 42 having a crystal concentration slightly less than that of the top layer 40.

An example of the percentage weights of the constituent components of the insert of FIGS. 7A and 7B is shown in Table V, below.

TABLE V

|  | DIAMOND | FILLER | β SiC | BORON | Si |
|---|---|---|---|---|---|
| Top layer | >83 |  | 5-6 |  | <10 |
| Corners | 50-53 |  | 30-33 |  | <15 |
| Core |  | 33-38 | 43-48 | 0.7-1.0 | <20 |

Figure 8A:
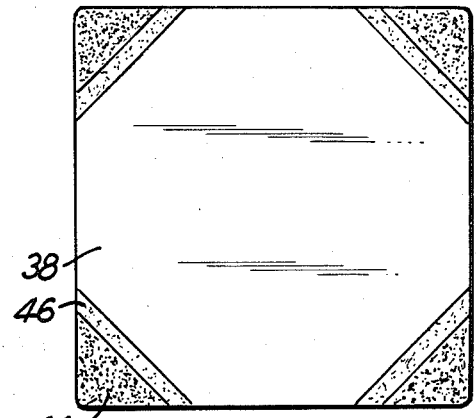
Figure 8B:
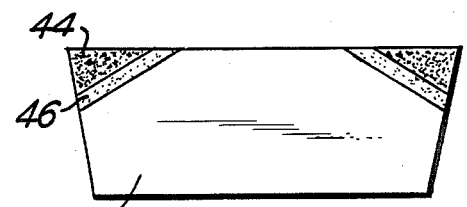

The insert shown in FIGS. 8A and 8B is similar to that shown in FIGS. 6A and 6B insofar as it includes a pair of crystal portions 44 and 46 disposed exclusively in corners of the square insert, crystal portion 44 having a high concentration of super-hard crystals, crystal portion 46 having a slightly lower percentage of crystals and forming an interface between crystal portion 44 and core 38.

TABLE VI

|  | DIAMOND | FILLER | β SiC | BORON | Si |
|---|---|---|---|---|---|
| Crystal portion 44 | >83 |  | 5-6 |  | <10 |
| Crystal portion 46 | 70-74 |  | 10-14 |  | <15 |
| Core |  | 44-49 | 30-36 | <1.3 | <20 |

Thus, the insert produced in accordance with the present invention may be provided with a higher concentration of super-hard crystals in critical areas without increasing the consumption of these super-hard crystal. The embodiments of FIGS. 2C, 3A, 3B, 4A, 4B, 7A and 7B provide a strengthened composite by preventing lamination failure through the use of a top layer. The cost and complexity of the inserts are reduced since bonding of the inserts onto a carbide substrate is not required, the cost of the material in the core of the insert being much less than that of tungsten carbide. Further, no major grinding of the insert is required and the inserts may be produced in accordance with the straightforward press and treat technique.

While the above embodiments and examples of the present invention have been described with reference to the foregoing specification and claims, the scope of the invention will now be described with reference to the following claims.

What is claimed is:

1. A cutting insert comprising:
   a polygonal composite having a plurality of corners, said composite including (i) a top layer covering said composite including a first concentration of super-hard crystals selected from the group consisting of diamond or cubic boron nitride crystals, (ii) a core layer and (iii) corner portions containing a second concentration of said super-hard crystals disposed exclusively at said corners of said composite between said top layer and said core layer, wherein said top layer, core layer and corner portions are united by a matrix of silicon carbide and silicon and form a composite having a thickness of ⅛ inch or 3/16 inch.

2. The cutting insert of claim 1 wherein said second concentration is lower than said first concentration.

3. The cutting insert of claim 2 wherein said composite is generally triangular in shape, and said top layer and said corner portion are 80-90 percent and 50-83 percent diamond by weight, respectively.

4. The cutting insert of claim 2 wherein said composite is generally triangular in shape and said top layer, core layer and corner portions have the following approximate percentage weights of the following contents:

|  | DIAMOND | β SiC | Si | Boron | α SiC or β SiC |
|---|---|---|---|---|---|
| Top Layer(22) | 83-84 | 5-6 | 8-11 |  |  |
| Corners(24) | 80-82 | 6-9 | 8-11 |  |  |
| Core(26) |  | 30-40 | 15-22 | 0.3-0.6 | 40-50 |

5. The cutting insert of claim 1 wherein said first and second concentrations are substantially equal, said top layer and said corner portions forming an integral upper surface for said insert.

6. The cutting insert of claim 5 wherein said composite is generally triangular in shape and said top layer, core layer and corner portions have the following approximate percentage weights of the following contents:

|  | DIAMOND | SiC | Si | Boron | α SiC or β SiC |
|---|---|---|---|---|---|
| Top & Corners(28) | 80-82 | 6-8 | 8-11 |  |  |
| Core(26) |  | 30-40 | 15-22 | 0.3-0.6 | 40-50 |

7. The cutting insert of claim 2 wherein said composite is generally square in shape and said top layer, core layer and corner portions have the following approximate percentage weights of the following contents:

|  | DIAMOND | FILLER | β SiC | BORON | Si |
|---|---|---|---|---|---|
| Top layer | >83 |  | 5-6 |  | <10 |
| Corners | 50-53 |  | 30-33 |  | <15 |

|      | DIAMOND | FILLER | β SiC | BORON | Si  |
| ---- | ------- | ------ | ----- | ----- | --- |
| Core |         | 33–38  | 43–48 | 0.7–1.0 | <20 |

8. The cutting insert of claim 1 wherein said top layer, core layer and corner portions exclusively combine to form a composite which may be used without a substrate.

9. The cutting insert of claim 8 wherein at least a portion of said top layer is polished.

10. A cutting insert comprising:
at least one crystal portion containing a first concentration of super-hard crystals selected from the group consisting of diamond or cubic boron nitride crystals, and a core portion, said at least one crystal portion and said core portion united by a matrix of silicon carbide and silicon and exclusively forming a composite having a thickness of ⅛ inch or 3/16 inch, wherein said at least one crystal portion includes a crystal portion disposed exclusively about the periphery of the composite and extending from the upper surface of said composite to a depth of approximately ½ the thickness of the composite.

11. The cutting insert of claim 10 wherein said composite is polygonal in shape and said at least one crystal portion includes first crystal portions disposed exclusively at the corners of said composite.

12. The cutting insert of claim 11 further comprising additional crystal portions containing a second concentration of said super-hard crystals lower than said first concentration, said second crystal portions disposed between said first crystal portions and said core portion.

13. The cutting insert of claim 12 wherein said composite is generally square in shape and said first crystal portions, said additional crystal portions and said core portion have the following approximate percentage weights of the following contents:

|                    | DIAMOND | FILLER | β SiC  | BORON | Si  |
| ------------------ | ------- | ------ | ------ | ----- | --- |
| Crystal portion 44 | >83     |        | 5–6    |       | <10 |
| Crystal portion 46 | 70–74   |        | 10–14  |       | <15 |
| Core               |         | 44–49  | 30–36  | <1.3  | <20 |

14. The cutting insert of claim 10 wherein said composite is generally circular in shape and said at least one crystal portion includes a crystal portion disposed exclusively about the periphery of the composite extending from the upper surface of said composite to a depth of approximately ½ the thickness of the composite.

15. The cutting insert of claim 10 wherein a first crystal portion containing a first concentration of super-hard crystals forms the upper surface of said composite, and an additional crystal portion containing a second concentration of said super-hard crystals lower than said first concentration is disposed about the periphery of said composite adjacent to said first crystal portion and extending to a depth of approximately ½ the thickness of said composite.

* * * * *